(12) United States Patent
Gore et al.

(10) Patent No.: US 9,293,803 B1
(45) Date of Patent: Mar. 22, 2016

(54) INTERNALLY FITTABLE AND REMOVABLE MOUNT FOR EXTERNAL ANTENNA

(71) Applicant: Neurio Technology Inc., Vancouver (CA)

(72) Inventors: Colby Gore, North Vancouver (CA); Jonathan Mark Hallam, Vancouver (CA); Christopher Hennig, Burnaby (CA); Derek Disanjh, Delta (CA); Hugh Patterson, Vancouver (CA); Josh Usher, Vancouver (CA)

(73) Assignee: Neurio Technology Inc., Vancouver (CA)

( * ) Notice: Subject to any disclaimer, the term of this patent is extended or adjusted under 35 U.S.C. 154(b) by 0 days.

(21) Appl. No.: 14/517,780

(22) Filed: Oct. 17, 2014

(51) Int. Cl.
| F16M 11/00 | (2006.01) |
| H01Q 1/12 | (2006.01) |
| F16B 9/02 | (2006.01) |

(52) U.S. Cl.
CPC . *H01Q 1/12* (2013.01); *F16B 9/023* (2013.01)

(58) Field of Classification Search
CPC .................................. H01Q 1/12; F16B 9/023
See application file for complete search history.

(56) References Cited

U.S. PATENT DOCUMENTS

| 5,583,522 A * | 12/1996 | Radomski | H01Q 1/1214 343/715 |
| 6,554,555 B2 * | 4/2003 | Imahigashi | H01Q 1/3275 411/149 |
| 7,222,829 B2 * | 5/2007 | Takahashi | H01Q 1/3275 248/231.9 |
| 7,492,319 B2 * | 2/2009 | Lindackers | H01Q 1/3275 343/711 |
| 8,844,893 B2 * | 9/2014 | Spagnolo | H01Q 1/1214 248/216.1 |
| 2011/0133047 A1 * | 6/2011 | Lerchner | H01Q 1/1214 248/231.21 |
| 2011/0260030 A1 * | 10/2011 | Calearo | H01Q 1/1214 248/534 |

OTHER PUBLICATIONS

International Search Report issued for Patent Cooperation Treaty application No. PCT/CA2015/050109, with a mailing date of Jul. 14, 2015.
Written Opinion issued for Patent Cooperation Treaty application No. PCT/CA2015/050109, with a mailing date of Jul. 14, 2015.

* cited by examiner

*Primary Examiner* — Amy Sterling
(74) *Attorney, Agent, or Firm* — John R. Flanagan

(57) ABSTRACT

The mount allows an antenna to be fitted to an inaccessible side of a panel from an accessible side, through a knockout. An antenna and cable are first fitted to the mount. The mount has clips that can be squeezed inwards so that it can be inserted into the knockout, and then released so that they retain the mount from the far side of the panel. Stops on the mount prevent it from being inserted too far. The tabs may be squeezed with finger pressure only so that the mount can be fitted in restricted locations where access is difficult, such as in an electrical breaker box. The mount can easily be removed by squeezing the tabs.

15 Claims, 3 Drawing Sheets

INTERNALLY FITTABLE AND REMOVABLE MOUNT FOR EXTERNAL ANTENNA

TECHNICAL FIELD

This application concerns a mount for an antenna. More particularly, it concerns a rugged mount that can be removably fitted and removed by hand from a single, accessible side of a panel, in order to mount an antenna on the panel's other, inaccessible side.

BACKGROUND

Advances in technology have increased the ability of consumers to monitor their electricity consumption. Electricity sensors are now widely available as consumer electronics, for monitoring the total electricity consumption of a household. Most of the sensors are capable of transmitting sensory data to a cloud service for potential analysis or other usage. Each sample of data captured may include parameters such as voltage, current, apparent power, reactive power and energy for each individual phase. Most homes have two and some have three phases. A problem exists when sensors are installed inside a breaker box or panel and a wireless connection is required from the sensor to a router or otherwise to the cloud service or a local computer. Attenuation of signals due to the box acting as a Faraday cage prevents successful mounting of the antenna inside the box. While in some cases a breaker box is mounted on a wall, in many other cases it is recessed in the wall so that only its front panel is accessible.

This background information is provided to reveal information believed by the applicant to be of possible relevance to the present invention. No admission is necessarily intended, nor should be construed, that any of the preceding information constitutes prior art against the present invention, unless explicitly specified.

SUMMARY OF INVENTION

The present invention is a mount to which an antenna can be attached and then be fitted from the interior of a breaker box into a knockout in the box wall or panel. The mount has a hole through which an antenna is mounted. It has one or more tabs that can be squeezed with only finger pressure in order to fit the assembly into the knockout. One or more stops on the mount prevent it passing right through the knockout. Upon releasing the tabs, which are now partially through the knockout, they spring outwards to secure the mount with clips onto the outside of the breaker box.

The present invention is directed to a mount for fitting an antenna to a distal side of a panel from a proximal side of the panel, through a knockout in the panel, the mount comprising: a body having a distal end, a proximal end and a hole passing from the distal end to the proximal end for accommodating a signal conductor for electrical connection to the antenna; one or more tabs attached to the distal end and projecting into the proximal end, said tabs being inwardly flexible; a clip projecting outwards from an outer surface of each tab at the distal end; a retaining surface on each clip located in a first plane and facing towards the proximal end; one or more wings attached to and projecting radially outwards from the proximal end, each wing having a stop surface located in a second plane and facing towards the distal end; and a gap between the first and second planes for accommodating a thickness of the panel; wherein, when said tabs are flexed inwards, the mount can be passed into the knockout until said stop surfaces engage with the proximal side of the panel and, when said tabs are then released, the mount can be retained in the knockout by said retaining surfaces engaging with the distal side of the panel.

The present invention is also directed to a method of fitting an antenna to a distal side of a panel from a proximal side of the panel, through a knockout in the panel, comprising the steps of: attaching the antenna and a cable to and through a mount; moving tabs on the mount inwards so that clips on the tabs can pass through the knockout; inserting a distal end of the mount into the knockout from the proximal side of the panel until stop surfaces on wings on the mount engage with the proximal side of the panel; and releasing the tabs so that the clips move outwards and retaining surfaces on the clips engage with the distal side of the panel to retain the mount in the knockout.

BRIEF DESCRIPTION OF DRAWINGS

The following drawings are illustrative of an embodiment of the present invention and should not be construed as restricting the scope of the invention in any way.

DESCRIPTION

A. Glossary

Breaker box—Any enclosure, usually metal such as steel, into which a source of electricity is fed and distributed to separate circuits in a home or business. Each separate circuit has a breaker or fuse that will break the circuit if it is overloaded. A breaker box or panel can be mounted on a wall or recessed in the wall. Breaker boxes are sometimes referred to as breaker panels.

Knockout—A partially stamped hole in a panel or wall, which can be punched and/or twisted out with relatively little force in order to provide access through the panel. In the context herein, knockouts are designed for attaching conduits that provide paths for wiring into and out from a breaker box. The knockouts are typically located on the side of the box. While usually circular in shape, other shapes are possible, and burrs can be left after their removal.

SMA—Sub-miniature Version A type of coaxial connector commonly used for Wi-Fi antennae.

Signal conductor—Herein this refers to either or both of a cable and an electrical connector for connecting an antenna to the cable.

B. Device

Figure 1:
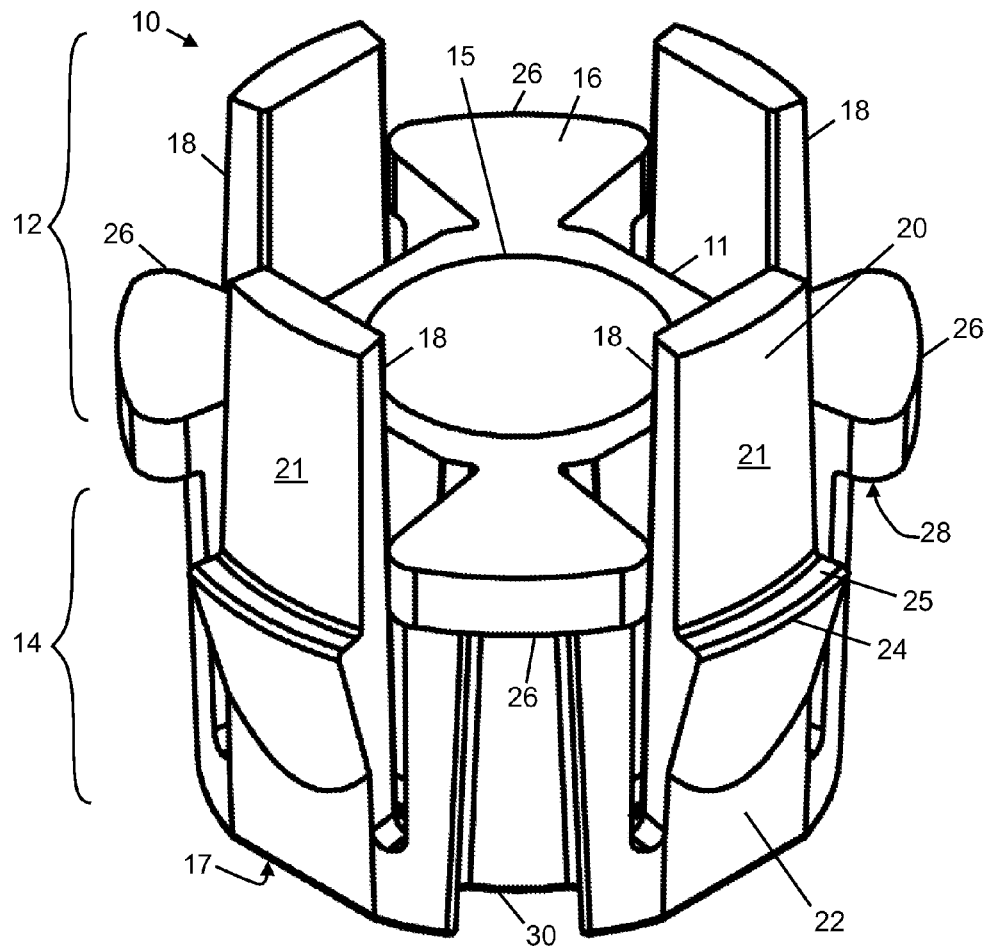
FIG. 1 is an enlarged perspective view of a mount according to an embodiment of the present invention.

Referring to FIG. 1, a mount 10 according to an embodiment of the present invention is shown. The mount 10 includes a body 11 having a proximal end 12 and a distal end 14. When installed in a breaker box (not shown), the proximal end 12 of the mount body 11 remains inside the breaker box and the distal end 14 of the mount body 11 projects outside the breaker box. The body 11 of the mount 10 has a hole 15 passing all the way through from an inner-facing surface 16 to an outer-facing surface 17 relative to the inside and outside of the breaker box. The hole 15 is used for passing an antenna cable through, and for fixing a connector of the cable and/or the cable to the mount 10.

On its body 11 the mount 10 has a plurality of tabs 18, each of which has a proximal end 20, a distal end 22 and an outer surface 21. Each tab at its proximal end 20 can move inwards and outwards relative to the centerline or axis of the mount. The distal ends 22 of the tabs 18 are connected to the distal end 14 of the mount body 11 by using well-known fabrication techniques as to provide sufficient inwards and outwards flexing of the tabs without them breaking. Part way along each tab 18, and at the distal end 14 of the body 11 of the mount 10, is a clip 24 projecting outwards from the outer surface 21 of the tab. The clips 24 have inner-facing retaining surfaces 25, shown here with radiused inner and outer edges. The retaining surfaces 25 are in a common plane, facing towards the proximal end 12 of the body 11 of the mount 10. When the tabs 18 are flexed inwards, the clips 24 also move inwards, reducing the effective outside diameter of the mount 10 at a height of the retaining surfaces 25, allowing the clips to be pushed through a knockout that the mount is inserted in. The flexibility of the tabs 18 is high enough that only moderate squeezing force from an installer's fingers is required to move the tabs inwards sufficiently to fit and remove the mount 10. This is important because access to the mounting location, in a knockout of a breaker box, is usually constricted. A further benefit, in this embodiment, is that a specialized insertion and removal tool is not required. The flexibility of the tabs 18 is afforded by them being of sufficient length, by their distal ends 22 being of thin enough cross-section, and by the choice of material from which the mount 10 is made. Also, the position of the clips 24 along the tabs should be taken into consideration when determining how far inwards they need to move in response to the desired level of finger force.

The body 11 of the mount 10 also has thereon a plurality of wings 26 protruding radially outwards from the mount body 11 at its proximal end 12. The wings 26 are located in circumferentially alternating positions relative to the positions of the tabs 18. Each wing 26 has an outer-facing stop surface 28, all in another, common plane and facing towards the distal end 14 of the mount 10. As described below in greater detail with reference to FIG. 2, the wings 26 protrude beyond the diameter of the knockout so that the stop surfaces 28 come into contact or engage with the inner surface of a wall or panel of the breaker box as the mount is pushed into the knockout, preventing the mount from passing completely through the knockout. The panel of the breaker box is accommodated between the retaining surfaces 25 and the stop surfaces 28, so there is necessarily a height gap between the plane of the retaining surfaces and the plane of the stop surfaces.

Slots 30 are present in the sides of the body 11 of the mount 10 in order to accommodate any burrs or vestiges of connecting material that may be present after the knockout has been removed. In this embodiment, two opposing slots 30 are included, but there may be different numbers of slots and/or different positions of the slots in other embodiments.

Figure 2:
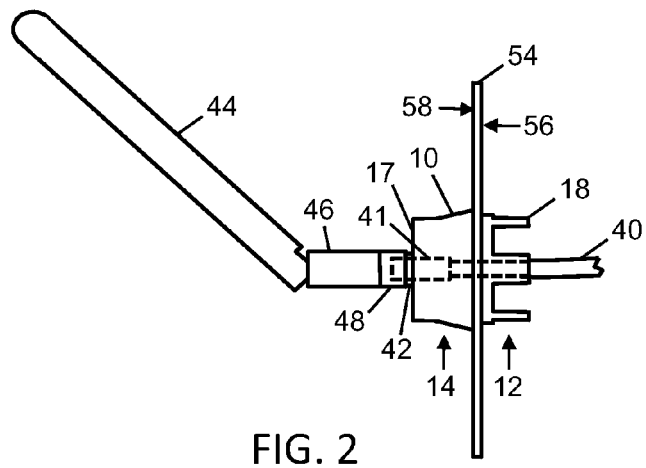
FIG. 2 is a schematic representation of an antenna fitted to the mount of FIG. 1, and the assembly thereof then fitted to a panel of a breaker box.

FIG. 2 shows an antenna cable 40 attached through the body 11 of the mount 10. The cable 40 is terminated with a male SMA connector 41, which is attached to the mount 10 with a retaining nut 42 and retaining washer (not shown). A Wi-Fi whip antenna 44, with an articulating base 46 that provides pivoting and rotating movement to the antenna, is connected via its female connector 48 to the male connector 41 of the cable 40. The mount 10 has been inserted in a knockout in a portion of panel 54, such as a panel of a breaker box. The mount 10 has been inserted from an inner side 56 of the panel 54 by squeezing the tabs 18, so that its distal end 14 projects through the panel and its proximal end 12 remains on the inside of the panel. Upon releasing the tabs 18, the retaining surfaces 25 of the clips 24 come in contact with the outer surface 58 of the panel 54. The mount and antenna assembly is therefore mechanically held in place in the knockout by the retaining surfaces 25 and the stop surfaces 28. The fit may be loose or snug depending on the embodiment chosen and the thickness of the panel 54 to which the mount 10 is fitted. After mounting, the antenna 44 will typically be inside a wall cavity, which may or may not contain thermal insulation. If there is ever a problem with the antenna or the cabling to it, then the antenna and mount assembly can easily be removed by squeezing the tabs 18 and withdrawing the mount 10 from the knockout.

Figure 3:
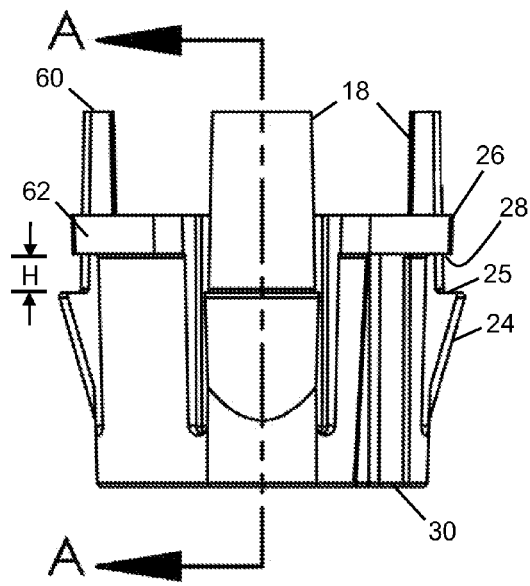
FIG. 3 is a side elevation of the mount of FIG. 1, showing partial hidden detail of a cable and connector.

FIG. 3 shows clearly the separation H between the plane of the retaining surfaces 25 on the clips 24 of the mount 10 and the plane of the stop surfaces 28 on the wings 26 of the mount 10. The dimension H should be large enough to accommodate the usual thicknesses of breaker box panel, particularly if a range of different breaker boxes are to be fitted with mounts of identical dimensions. There should be enough tolerance in dimension H so that the clips 24 can spring outwards after being released without being impeded by friction against the breaker box panel. One of the slots 30 on the side of the mount 10 is also clearly shown. Also shown are suggested locations 60, 62 for injection molding gates if the mount 10 is to be made as a single piece.

Figure 4:
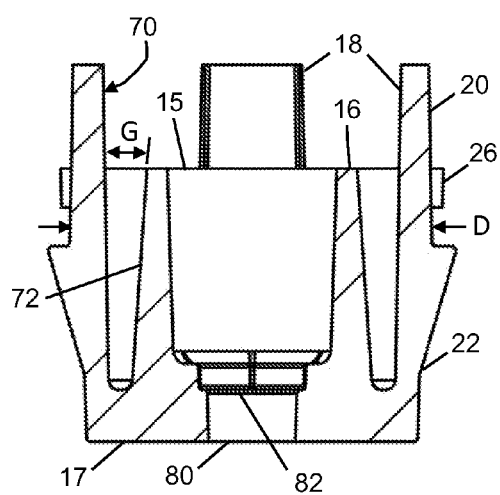
FIG. 4 is a cross-section of the mount shown in FIG. 3, taken along line A-A.

In FIG. 4 the tabs 18 are clearly seen as elongate with a relatively thin cross-section, with proximal end 20 and distal end 22. The tabs 18 are connected via their distal ends 22 to the distal end 14 of the mount body 11. The tabs 18 are dimensioned such that their inner surfaces 70 are spaced sufficiently apart by a tapered gap G from surface 72 of the inner core of the mount 10 that they can be freely flexed inwards. The diameter D of the mount 10 between the retaining surfaces 25 and the stop surfaces 28 should be small enough to fit inside the knockout. Depending on the embodiment, different levels of snugness of fit may be chosen between the mount 10 and the circumference of the knockout.

The hole 15 for the antenna cable passes from the inner-facing surface 16 of the mount 10 all the way through the mount to the outer-facing surface 17, where the aperture 80 of the hole is smaller than in surface 16. Within the hole 15, an optional hexagonal socket 82 is molded, for retaining the hexagonal nut that is part of the male connector 41 at the end of the antenna cable. By using the mount 10 to retain the connector nut, it becomes easier to tighten the retaining nut 42, with optional retaining washer, to firmly attach the cable to the mount.

Figure 5:
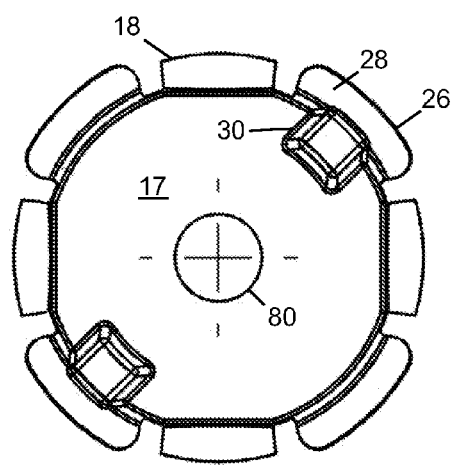
FIG. 5 is a bottom view of the mount shown in FIG. 3.

In FIG. 5 the burr-relieving slots 30 and aperture 80 in the outer-facing surface 17 of the mount body 11 are shown. Also indicated are the tabs 18 and the stop surfaces 28 of the wings 26.

Figure 6:
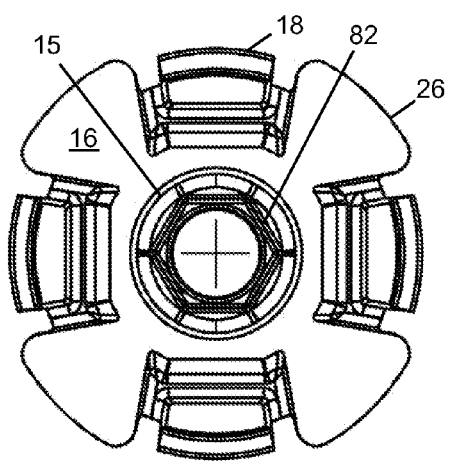
FIG. 6 is a top view of the mount shown in FIG. 3.

In FIG. 6 there is shown the inner-facing surface 16 of the mount body 11, the hole 15 of the mount body 11 for the cable 40, and the hexagonal socket 82 of the mount body 11 for the nut on the cable connector. The tabs 18 and wings 26 are also indicated.

The mount 10 may be made by injection molding, for example. It may be made as a one-piece component to keep the cost of production and installation down. Suitable plastics that may be used include, for example only, nylon, (e.g. nylon-6), urethane and polycarbonate. Other methods of manufacture include 3D printing. The mount may also conceivably be cast in a metal or alloy.

The material from which the mount is made may be selected with enough tensile strength so that the mount 10 meets all the relevant safety standards (e.g. CSA 61010-1-12, clauses 8.2.1 and 8.2.2). Specifically, these relate to the mount being able to withstand a static force of 30 N and an impact of 5 J. The material chosen should ideally provide electrical insulation for the exposed metal portion of the female antenna connector sufficiently to comply with electrical probe safety tests. In addition, the material should meet any required flammability ratings (e.g. UL94 V-0).

C. Exemplary Method

Figure 7:
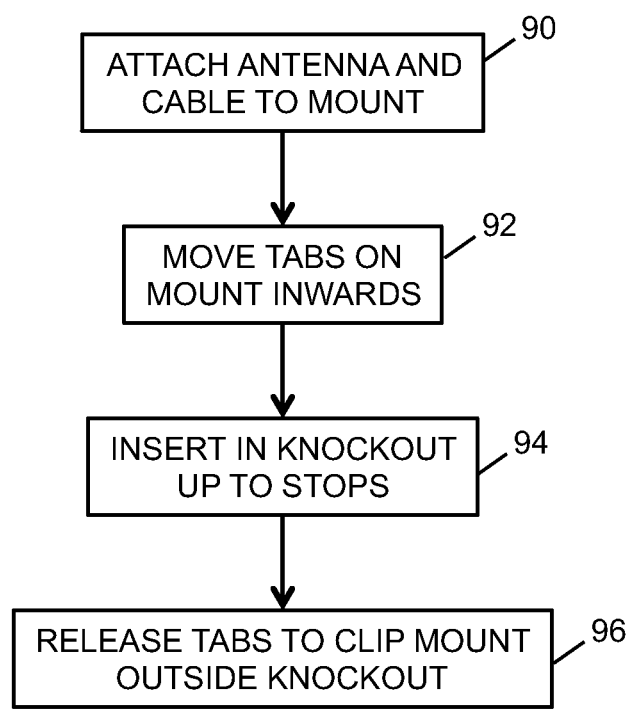
FIG. 7 is a flow chart for a method of mounting an antenna using a mount according to an embodiment of the present invention.

FIG. 7 shows a flowchart of an exemplary method for mounting an antenna in a knockout in a restricted location where only one side of the panel, though which the antenna is to be mounted, is accessible. Step 90 involves first mounting the antenna and a cable to and through the mount, such that the antenna projects from the distal side of the mount and the cable projects from the proximal end of the mount. The antenna and cable may both be removably attached to the mount, or one or both of them may be permanently attached to it. This step may be performed at installation, at manufacture, or partly at both.

In step 92, tabs on the mount are squeezed or otherwise moved inwards by hand in order to bring clips on the tabs from a diameter that is larger than the knockout down to a diameter that is less than that of the knockout. This is so that the clips can be inserted through the knockout without forcing them through the knockout. Squeezing may be by finger pressure only. In some cases, squeezing may only need to be partially achieved, or it can even be omitted if the slope on the outer surface of the clips is smooth and resilient enough to slide over the edge of the knockout when the mount is pushed in by hand, to force the clips inwards. In other embodiments, the tabs may be squeezed inwards by a tool.

In step 94, the mount is inserted into the knockout as far as it will go, which is up to the stop surfaces on the mount. In step 96, the tabs are released. This may be by the installer removing squeezing pressure from the tabs, or removing the insertion tool, or by the clips on the mount clicking past the edge of the knockout. The action of releasing the tabs causes them to move outwards, so that the inner-facing surfaces of the clips engage with the outside surface of the panel surrounding the knockout. Engagement of the stop surfaces and the retaining surfaces may be snug or loose depending on the tolerances with which the mount is made and the specific thickness of the panel into which the mount is inserted. Removal is the opposite of insertion.

D. Industrial Applicability

The mount is useful for non-permanently mounting antennae in restricted locations, for example from within the interior of a breaker box so that the antennae is outside the box for effective operation. More generally, the mount may be used to mount antennae in other panels where only one side of the panel is accessible.

E. Variations

The present description is of the best presently contemplated mode of carrying out the subject matter disclosed and claimed herein. The description is made for the purpose of illustrating the general principles of the subject matter and not to be taken in a limiting sense; the subject matter can find utility in a variety of implementations without departing from the scope of the disclosure made, as will be apparent to those of skill in the art from an understanding of the principles that underlie the subject matter.

Throughout the description, specific details have been set forth in order to provide a more thorough understanding of the invention. However, the invention may be practiced without these particulars. In other instances, well known elements have not been shown or described in detail to avoid unnecessarily obscuring the invention. In general, unless otherwise indicated, singular elements may be in the plural and vice versa with no loss of generality. Steps in methods may have other steps added, or one or more steps may be removed without altering the main function of the system. All parameters, dimensions, materials, and configurations described herein are examples only and actual values or choices of such depend on the specific embodiment.

Other embodiments that are within the scope of the invention include mounts with a different number of tabs. For example, there could be two, three or five tabs. It is also conceivable that there be only one tab, which may be wider than the tabs shown herein. If there is only one tab, then there may be a fixed slot for engaging with the edge of the knockout opposite the tab, or a fixed retaining surface. There may be multiple clips on a tab. There may be fewer or more than four wings. Tabs may have different sizes in the same mount. Likewise, wings may have different sizes in the same mount. While an integral, one-piece construction of the mount has been described, it is also possible that the mount be made from two or more separate pieces that fasten together. While the mount has been described in relation to use in breaker boxes, it will also find use in other areas where access is difficult. In some cases the mount may be intended for permanent fixing. In other cases, it may be configured for mounting and removal using a specialized tool. The mount may be dimensioned for antennae other than Wi-Fi whip antennae, and for connectors other than SMA connectors. The mount may be made integral with the connector at the end of the antenna. The mount may be integral with and include a length of cable. The mount may be integral with both a section of cable and the antenna. As such, the hole 15 is intended to accommodate a signal conductor whether it be a connector or a cable or both, and whether it be removable or permanently accommodated.

The retaining surface 25 need not be flat, and may have a relief pattern on it, or the clip 24 may have multiple smaller retaining surfaces, for example. Likewise, the stop surface 28 need not be flat, and may have a relief pattern on it, or the wing 26 may have multiple smaller retaining surfaces, for example. A compressible material may be included to provide one or both of the retaining and stop surfaces in order to make the fit of the mount to the knockout snugger, especially where the mount is a single product intended for use on panels of different thicknesses. The stop surfaces may be mounted on the tabs, and project radially outwards further than the retaining surfaces.

The scope of the invention is therefore to be construed in accordance with the substance defined by the following claims.

The invention claimed is:

1. A mount for fitting an antenna to a distal side of a panel from a proximal side of the panel, through a knockout in the panel, the mount comprising:

a body having a distal end, a proximal end and a hole passing from the distal end to the proximal end for accommodating a signal conductor for electrical connection to the antenna;

one or more tabs attached to the distal end of the body and projecting into the proximal end of the body, said tabs being inwardly flexible;

a clip projecting outwards from an outer surface of each tab at the distal end of the body;

a retaining surface on each clip located in a first plane and facing towards the proximal end of the body;

one or more wings attached to and projecting radially outwards from the proximal end of the body, each wing having a stop surface located in a second plane and facing towards the distal end of the body; and a gap between the first and second planes for accommodating a thickness of the panel;

wherein, when said tabs are flexed inwards, the mount can be passed into the knockout until said stop surfaces engage with the proximal side of the panel and, when said tabs are then released, the mount can be retained in the knockout by said retaining surfaces engaging with the distal side of the panel.

2. The mount of claim 1, further comprising one or more slots in the distal end of the body for accommodating one or more burrs in the knockout.

3. The mount of claim 1, further comprising a socket in the hole of the body for accommodating a nut of a signal conductor.

4. The mount of claim 1, wherein said tabs can be flexed inwards by finger pressure.

5. The mount of claim 1, wherein said tabs can be flexed inwards to remove the mount from the panel.

6. The mount of claim 1, wherein said tabs need a specialized tool to be flexed inwards.

7. The mount of claim 1, wherein there are four tabs.

8. The mount of claim 1, wherein there are four wings.

9. The mount of claim 8, wherein the wings and tabs are in circumferentially alternating positions.

10. The mount of claim 1, wherein the body, tabs and wings are made as a single piece.

11. The mount of claim 10, wherein the body, tabs and wings are injection molded.

12. The mount of claim 1, wherein the body, tabs and wings are 3D printed.

13. The mount of claim 1, wherein the body, tabs and wings are made from nylon.

14. The mount of claim 1, wherein the antenna is integral to the body.

15. The mount of claim 1, wherein the signal conductor is integral to the body.

* * * * *